(No Model.)
S. V. HALLOWAY.
HAME FASTENER.
No. 346,908. Patented Aug. 10, 1886.
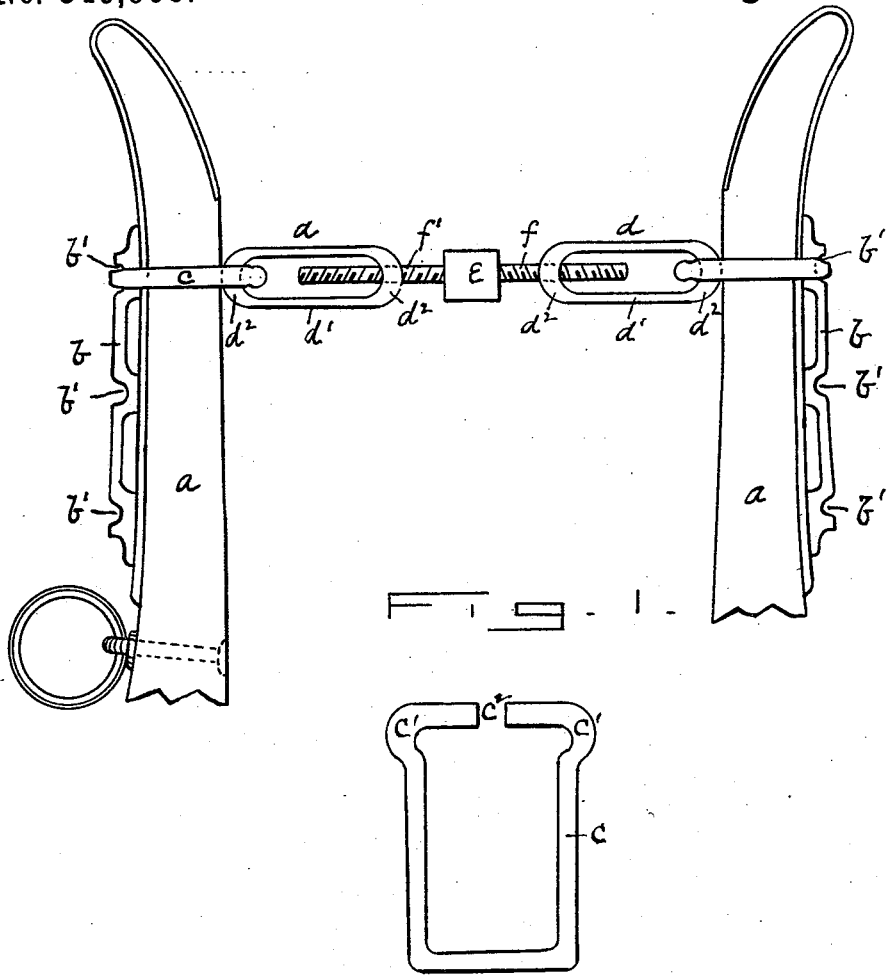

UNITED STATES PATENT OFFICE.

SENECA V. HALLOWAY, OF BUFFALO, NEW YORK.

HAME-FASTENER.

SPECIFICATION forming part of Letters Patent No. 346,908, dated August 10, 1886.

Application filed December 18, 1885. Serial No. 186,045. (No model.)

*To all whom it may concern:*

Be it known that I, SENECA V. HALLOWAY, a citizen of the United States, residing at Buffalo, in the county of Erie and State of New York, have invented certain new and useful Improvements in Hame-Fasteners; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention consists of a certain improved construction of hame-fastener, which will be more fully hereinafter described and claimed.

In the drawings, Figure 1 is an elevation of my improved hame-fastener, shown applied to the hames; and Fig. 2 is a detached view of link which encircles the hame top.

Referring to the drawings, $a$ $a$ are the tops of the hames, to which the fastener is applied. Upon the outside edge of these hames, near their tops, are secured the ordinary metallic plates, $b$ $b$, with the series of recesses $b'$ for the adjustment of the fastener.

$c$ $c$ are two links (clearly shown in Fig. 2) which are passed over the tops of the hames and engage with the recesses $b'$ in the plate $b$. The inner ends of these links $c$ are enlarged, as at $c'$ $c'$, and have the openings $c^2$.

$d$ $d$ are two oval links, having the narrow sides $d'$ $d'$ and thickened ends $d^2$ $d^2$.

E is a square block, through the center of which passes a screw-threaded rod having one end provided with a right hand screw and the other end with a left-hand screw, which are adapted to engage with and pass through screw-threaded holes in the inner ends of the links $d$ $d$.

The parts just described are put together and operate substantially as follows: The links $c$ $c$ are caught within the links $d$ $d$ by having one of their sides passed through opening $c^2$. When this is done the links $c$ $c$ are passed over the top ends of the hame, and caught within the proper sets of recesses $b'$ in the plate $b$, it being necessary in placing the links $c$ $c$ in position in the recesses $b'$ to have the links $d$ in an upright position, with the narrow sides $d'$ resting between the links $c$ $c$ and the inner surfaces of the hames. On turning the links $d$ $d$ to a position at right angles with the hames, as in Fig. 1, the thickened ends $d^2$ $d^2$ rest between the links $c$ $c$, and prevent the hames from being accidentally disengaged from the recesses $b'$. To remove the links $c$ $c$ from the hames or readjust them in a new set of recesses $b'$, the operation just described is reversed.

The links $d$ $d$ are secured together adjustably by means of the screw-threaded rods $f$ $f'$, which are passed into and through the screw-threaded ends of the links, and by turning the block E the hames are brought tightly together upon the collar, and presenting one of its flat sides to the collar is thereby prevented from turning, thus keeping the fastener at the desired adjustment.

It is designed to make all of the parts of the fastener of malleable iron.

Parts of my improved fastener, taken separately, I am aware, are old; but my invention consists of the fastener taken as a whole.

I claim—

A hame-fastener consisting of the links $c$ with openings $c^2$, the links $d$ with narrow sides, $d'$ and thickened ends $d^2$, and the block E, with its right and left hand screw-threaded rods $f$ and $f'$, all combined as shown, and adapted for adjustment upon the hames having the recessed plates $b$ $b'$, substantially as shown and described.

In testimony whereof I have signed my name to this specification in the presence of two subscribing witnesses.

SENECA V. HALLOWAY.

Witnesses:
SELAH C. CARL,
W. T. MILLER.